United States Patent [19]

Itezono

[11] Patent Number: 5,589,948
[45] Date of Patent: Dec. 31, 1996

[54] FACSIMILE APPARATUS

[75] Inventor: Toshiyuki Itezono, Yokohama, Japan

[73] Assignee: Canon Kabushiki Kaisha, Tokyo, Japan

[21] Appl. No.: 125,197

[22] Filed: Sep. 23, 1993

[30] Foreign Application Priority Data

Sep. 25, 1992 [JP] Japan .................................. 4-280498
Sep. 17, 1993 [JP] Japan .................................. 5-255132

[51] Int. Cl.$^6$ .................................................... H04N 1/40
[52] U.S. Cl. .................................... 358/449; 358/448
[58] Field of Search .................................... 358/448, 450, 358/451, 452, 449; 382/9, 61, 286, 199; 395/146, 147, 148

[56] References Cited

U.S. PATENT DOCUMENTS

4,631,596  12/1986  Yaguchi .................................. 358/449
4,977,463  12/1990  Fukuda .................................. 358/449
5,276,791   1/1994  Palmer .................................. 395/146

Primary Examiner—Edward L. Coles, Sr.
Assistant Examiner—Jerome Grant, II
Attorney, Agent, or Firm—Fitzpatrick, Cella, Harper & Scinto

[57] ABSTRACT

A facsimile apparatus comprises an input unit for inputting an image signal and a substitution unit for substituting an image area having consecutive main scan lines each containing no larger than a predetermined amount of significant information of the input image which is longer than a first predetermined length by a predetermined image of a second predetermined length in a direction of sub-scan.

12 Claims, 6 Drawing Sheets

FACSIMILE APPARATUS

BACKGROUND OF THE INVENTION

1. Field of the Invention

The present invention relates to a facsimile apparatus which, when receiving an image signal of a document sheet longer in a sub-scan direction than a predetermined length, records it within a record sheet of a predetermined length as much as possible or split-records it at a most proper position.

2. Related Background Art

Figure 1:
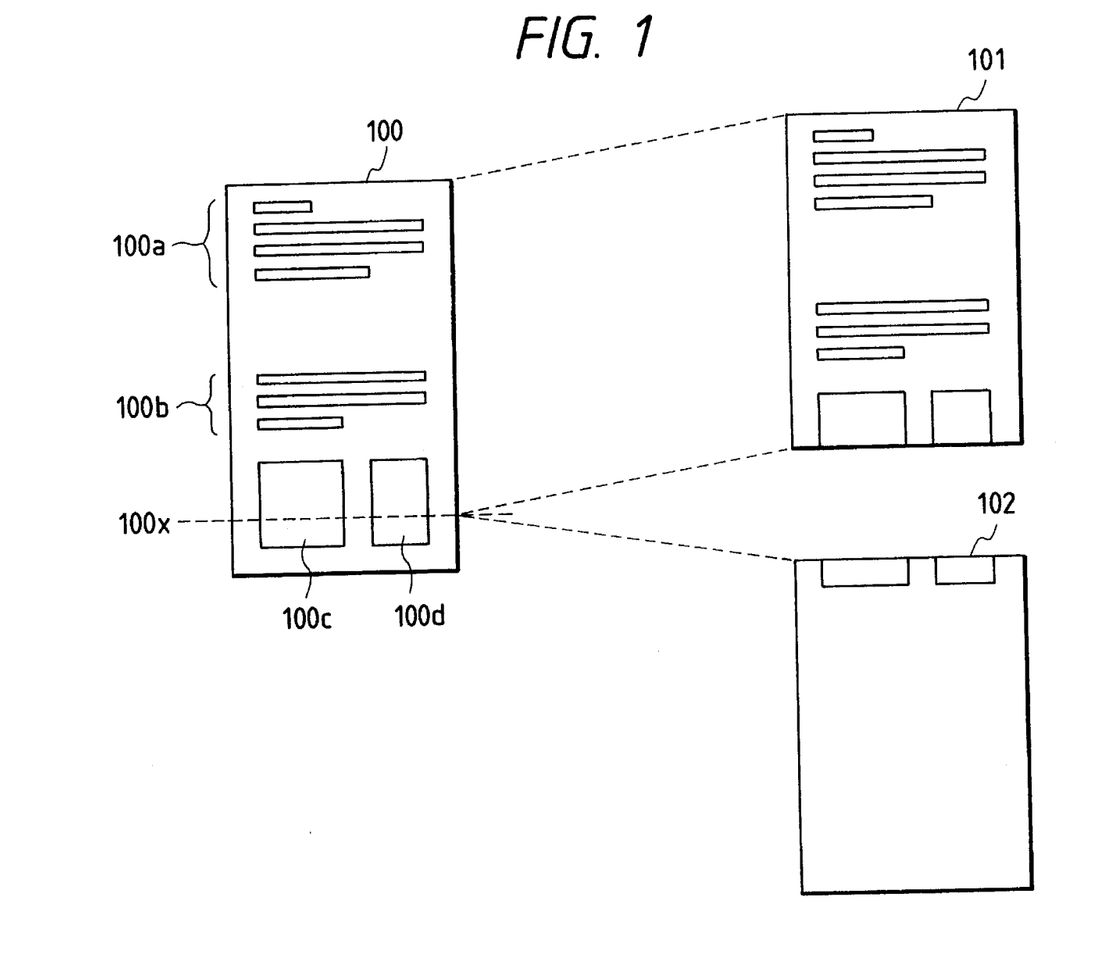
FIG. 1 illustrates a process of the reception of a long size document sheet in a prior art apparatus.

In a prior art facsimile apparatus, when a fixed size sheet is set as a record sheet and a long size document sheet is received, the document sheet 100 at a transmission station is split to the size of the fixed size sheet to record it on two record sheets 101 and 102, as shown in FIG. 1, for example.

In such a case, in the document sheet shown in FIG. 1, text areas 100a and 100b are recorded on the record sheet 101 as they are without split but photograph areas 100c and 100d are split by a line 100x. The upper half is recorded on the record sheet 101 while the lower half is recorded on the record sheet 102. In this manner, since the text, picture, table, graph and so on are frequently split, it is very hard to watch them.

As described above, in the prior art facsimile apparatus, when the long size document sheet is received, it is sequentially recorded from the leading edge of the document sheet until the trailing edge of the fixed size sheet is reached, then the document sheet is split and the remaining portion is recorded on the next record sheet. As a result, the text, picture and so on are split into two pages, which is very hard to watch and recognize.

SUMMARY OF THE INVENTION

It is an object of the present invention to improve the facsimile apparatus in view of the above problems.

It is another object of the present invention to provide a facsimile apparatus which, when receiving a long size image, does not split it but records it on one record sheet as much as possible, or splits it at a most proper split position.

Other objects of the present invention will be apparent from the following detailed description of the preferred embodiments and the accompanying drawings.

DETAILED DESCRIPTION OF THE PREFERRED EMBODIMENT

Figure 2:
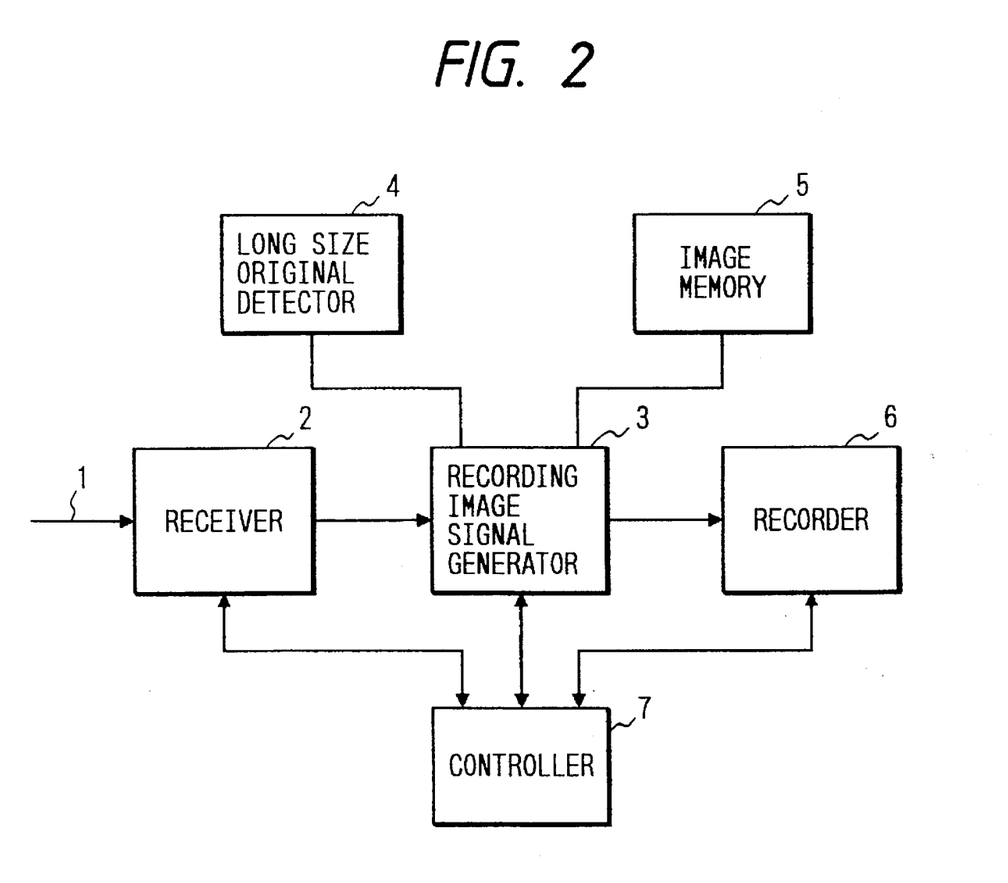
FIG. 2 shows a block diagram of a first embodiment of the present invention.

FIG. 2 shows one embodiment of the present invention.

In FIG. 2, a receiver 2 receives an image signal sent over a line 1, demodulates it, and sends it to a record image signal generator 3, which, when it receives the image signal sent from the receiver 2, detects an EOL indicating an end of line for each line and counts up a counter (not shown) in a long size document sheet detector 4, and encodes and expands it and stores it in an image memory 5. In accordance with the result of detection by the long size document sheet detector 4, the record image signal generator 3 generates a record image signal which is compressed in a direction of sub-scan so that the received long size document sheet is recorded on one page of the fixed size record sheet as much as possible, and sends it to a recorder 6. When the receiver 2 receives an image signal which is not a long size document sheet, the record image generator 3 does not compress the image signal in the image memory 5 in the direction of sub-scan as it does when the receiver 3 receives the long size document sheet, and sends the image signal to the recorder 6.

The recorder 6 records an image based on the image signal supplied from the record image signal generator 3. A controller 7 centrally controls the respective units.

An operation of the facsimile apparatus is now explained with reference to FIG. 3. The long size document sheet detector 4 counts the length of the document sheet 100 in the direction of sub-scan by the EOL in accordance with the received image signal of the document sheet 100 to determine if the length of the document sheet 100 in the direction of sub-scan is longer than the length of the fixed size record sheet in the direction of sub-scan.

If it is determined that the length of the document sheet 100 in the sub-scan direction is longer than the length of the fixed size record sheet in the sub-scan direction, it is informed to the record image signal generator 3. When the record image signal generator 3 receives the detection information of the long size document sheet, it sets a scan line 100x at a position spaced from a scan line at a leading edge of the received document sheet 100 in the image memory by a first predetermined length corresponding to the length of the fixed size record sheet in the direction of sub-scan.

Figure 3:
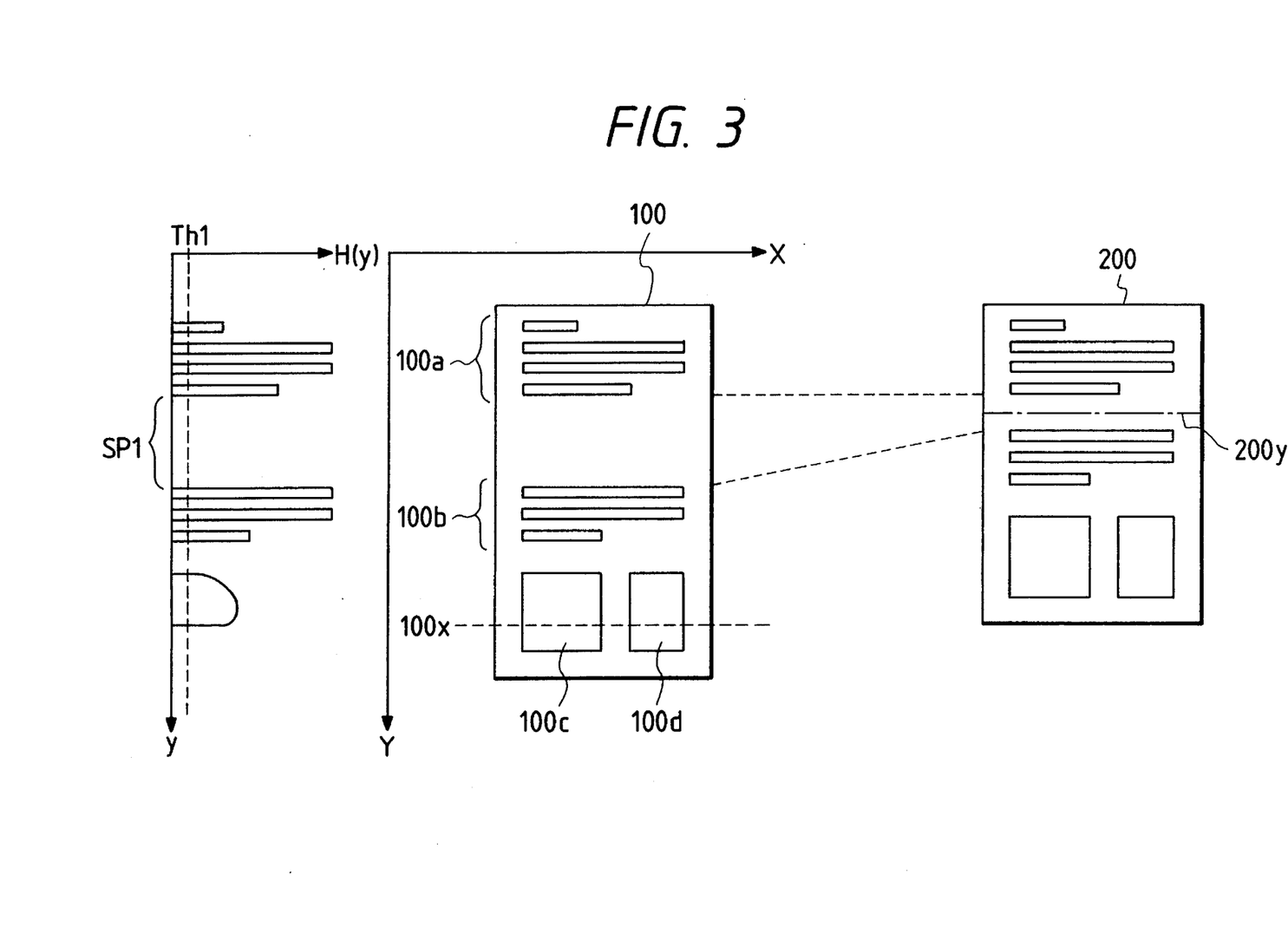
FIG. 3 illustrates a process in the reception of a long size document sheet in the first embodiment.

In an example shown in FIG. 3, photograph areas 100c and 100d cross the scan line 100x. In a simple split recording method of the prior art, the photograph areas 100c and 100d are split-recorded on two record sheets, which are hard to observe.

Thus, if the length in the direction of sub-scan is within one page of the fixed size record sheet having a first predetermined length in the direction of sub-scan by conducting a compression process in the direction of sub-scan wherein when there is searched an area which is blank over an entire main scan width and is no shorter than a second predetermined length in the direction of sub-scan between the scan line at the leading edge of the received document sheet 100 and the scan line 100x and such an area is found, it is replaced by an image (blank) of a third predetermined length which is shorter than the second predetermined length in the direction of sub-scan, then the compression process in the direction of sub-scan is conducted, and if the length in the direction of sub-scan is not within one page of the record sheet even with the compression process in the direction of sub-scan, the compression process is not conducted and the conventional simple split recording process is conducted.

In the present embodiment, the above blank area means an area having sequential main scan lines which contain significant information such as characters, graphics and photographs only under a predetermined condition over the entire area of the main scan width. In the present embodiment, it means an area having two or more consecutive main scan lines in the direction of sub-scan which have no larger than a predetermined number of accumulation of black pixels in the direction of main scan.

A specific method for detecting the blank area is now described. A main scan direction of the received document sheet 100 is represented by an X direction, and a sub-scan direction is represented by a Y direction. A histogram H(y) is prepared by accumulating black pixels in the X direction for each line between the scan line at the leading edge of the received document sheet 100 and the scan line 100x. An area in which consecutive scan lines having less than a predetermined threshold is no smaller than the second predetermined length is searched. In the example of FIG. 3, an area SP1 corresponds thereto.

The image of the third predetermined length which is shorter than the second predetermined length in the direction of sub-scan, which is to be substituted by the blank area may be a series of significant pixels in the horizontal scan direction, for example, a series of scan lines not containing black pixels in the direction of sub-scan, but in the present embodiment, it is an image having a chain line 200y added at a center of the area. It indicates that the compression process in the direction of sub-scan is conducted to that portion.

The regenerated image signal is recorded on the fixed size record sheet by the recorder 6.

Figure 4:
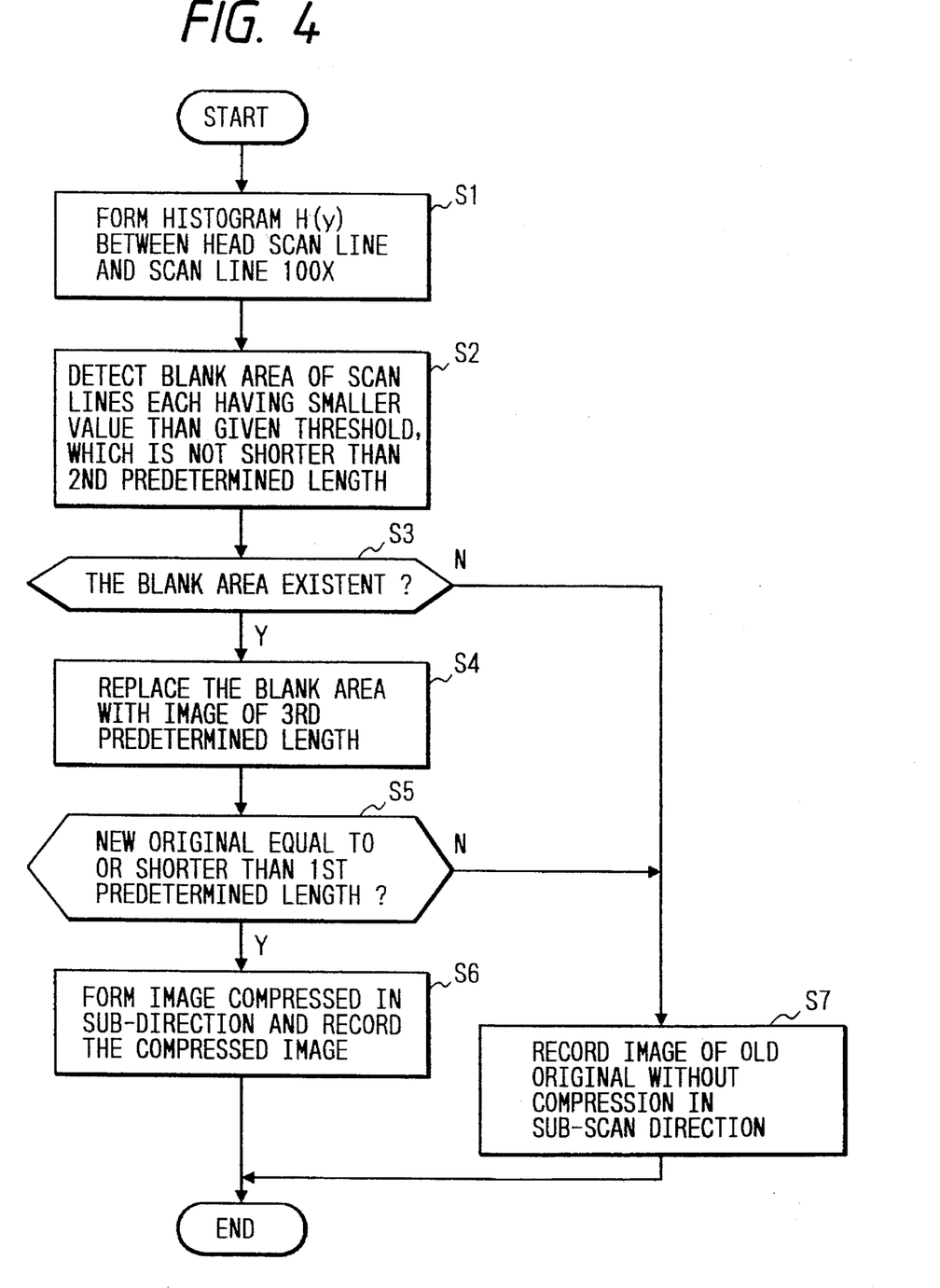
FIG. 4 shows a flow chart of the first embodiment.

A specific operation of the present embodiment when the length of the received document sheet 100 in the direction of sub-scan is longer than the length of the fixed size record sheet of the first predetermined length is explained with reference to a flow chart of FIG. 4.

In S1, the histogram H(y) is prepared in the manner described above between the scan line at the leading edge of the received document sheet 100 and the scan line 100x. In S2, on the basis of the histogram H(y), a blank area which has sequential scan lines having no larger than the predetermined threshold over no shorter than the second predetermined length is detected. In S3, if it is determined that no such blank area is present, the compression process in the direction of sub-scan is not conducted and the original image is recorded as it is by the recorder 6 in S7. If it is determined that the blank area is present in S3, the blank area is replaced by a substitution image, that is, an all-white image of the third predetermined length which is shorter than the blank area in the direction of sub-scan or an image having a horizontal chain line added in the X direction. The substitution image should assure that the length of the resulting new image in the direction of sub-scan is no longer than the first predetermined length, but if the substitution image has a certain length so that the length of the new image in the direction of sub-scan cannot be no longer than the first predetermined length, the compression in the direction of sub-scan is not conducted. The decision is made in S5. If the length is no longer than the first predetermined length, the process jumps to a step S7 where the compression process in the direction of sub-scan is not conducted but the original image is recorded as it is by the recorder 6. If the length is no longer than the first predetermined length, the process proceeds to S6 where the record image signal generator 3 generates a new image compressed in the direction of sub-scan in the image memory 5 and records it by the recorder 6.

A second embodiment of the present invention is now explained.

In the second embodiment, in accordance with the result of detection by the long size document sheet detector 4, the record image signal generator 3 generates a record image signal having properly split at the blank area so that the received long size document sheet is recorded on the fixed size record sheet in an easy-to-watch manner and sends it to the recorder 6. The other construction is common to that of the first embodiment (FIG. 2) and they are designated by the same numerals and the explanation thereof is omitted.

Figure 5:
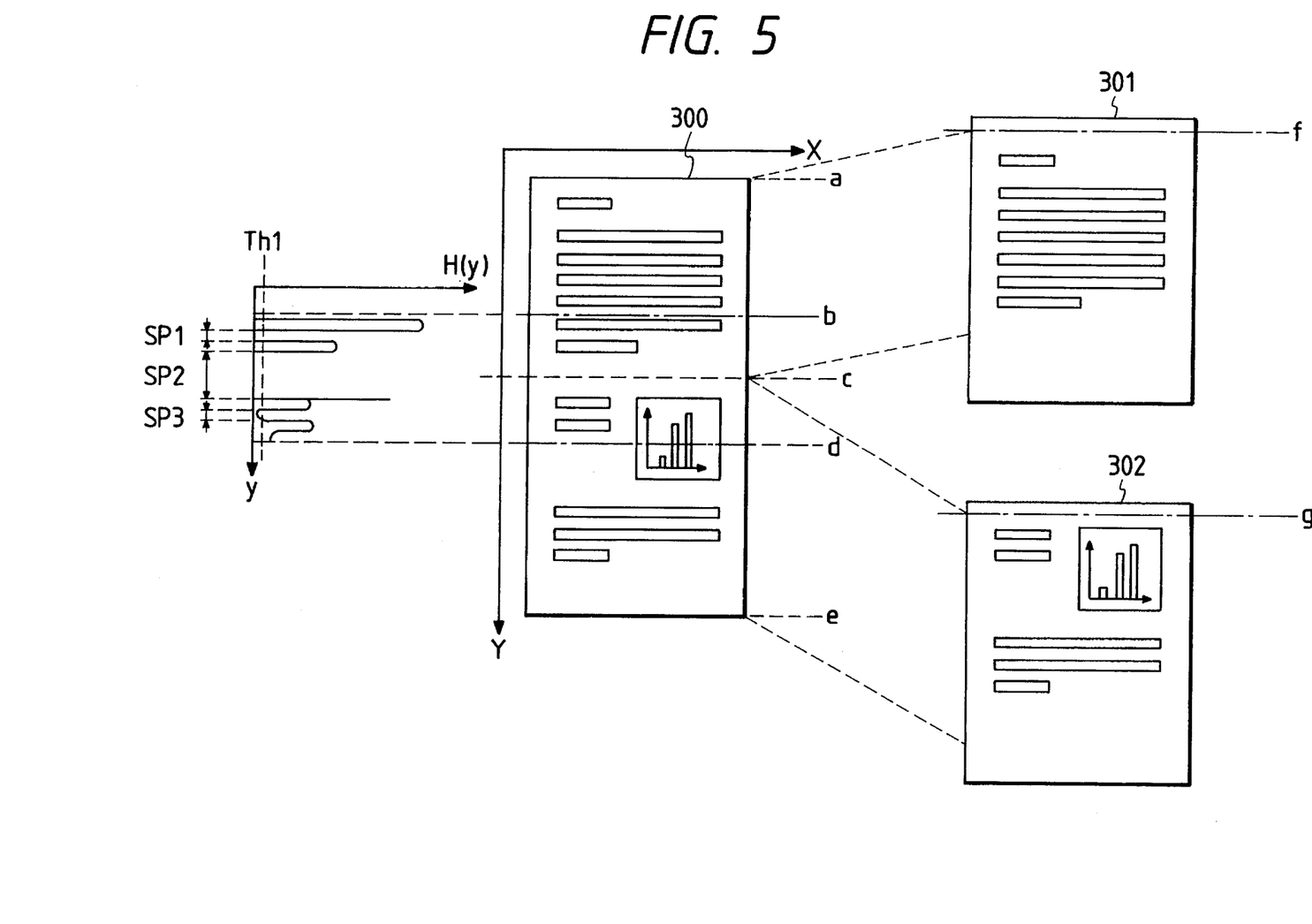
FIG. 5 illustrates a process in the reception of a long size document sheet in a second embodiment of the present invention.

An operation of the facsimile apparatus of the second embodiment is explained with reference to FIG. 5. When it is determined by the long size document sheet detector 4 that the received document sheet 300 is longer than the fixed size sheet, it is informed to the record image signal generator 3. When the record image signal generator 3 receives the detection information of the long size document sheet, it set a scan line d which is at a first predetermined length corresponding to a length of a recordable area of the fixed size record sheet in the direction of sub-scan excluding a leading edge margin and a trailing edge margin, from the leading edge scan line a in the image memory 5. In the example shown in FIG. 4, a graph area crosses the scan line d, and whether a character area and a picture area cross the scan line d or not, a scan line b is set at a position a predetermined length ahead of the leading edge of the document sheet. Then a blank area of no shorter than a predetermined length in the direction of sub-scan over the entire main scan width is searched between the scan line b and the scan line d, and a split line is set to the blank area having the longest length in the direction of sub-scan. The definition of the blank area is same as that in the first embodiment.

A process to set the split line of the document sheet between the scan line b and the scan line d is now explained. A histogram H(y) which is an accumulation of the number of pixels representing significant information such as characters, pictures and photographs in the direction of main scan, that is, the X direction in FIG. 5 is generated in the direction of sub-scan, that is, the Y direction in FIG. 5 between the scan line b and the scan line d. In the present embodiment, the pixels of the significant information of the characters, pictures and photographs are black pixels. In the histogram H(y), a scan line which is no larger than a predetermined threshold is determined as a scan line of the blank area.

An area in which the number of sequential scan lines of the blank area in the Y direction is no shorter than a predetermined length is searched. In the example of FIG. 5, areas SP1, SP2 and SP3 are detected. Of those, the area which is longest in the Y direction is detected and the scan line at the center of that area in the Y direction is set as the split line. In the example of FIG. 5, the area SP2 is longest and the scan line c at the center thereof is set as the split line.

If the area in which the length of the blank area in the Y direction is longer than the predetermined length is not detected, the proper split is given up and the conventional simple split is conducted.

In accordance with the setting of the split line, the record image signal generator 3 sends the image signal from the scan line a to the scan line c to the recorder 6, sends a margin of several lines at the leading edge of the record sheet 301 to a motor (not shown) and records on the record sheet 301 starting from the record line f. The image signal after the scan line c is recorded on the record sheet 302 starting from the record line g after a margin of the record sheet 302 as it is for the record sheet 301.

As a result, the image signal of the long size document sheet 300 is split-recorded on the fixed size record sheets 301 and 302 in the easy-to-see form.

Figure 6:
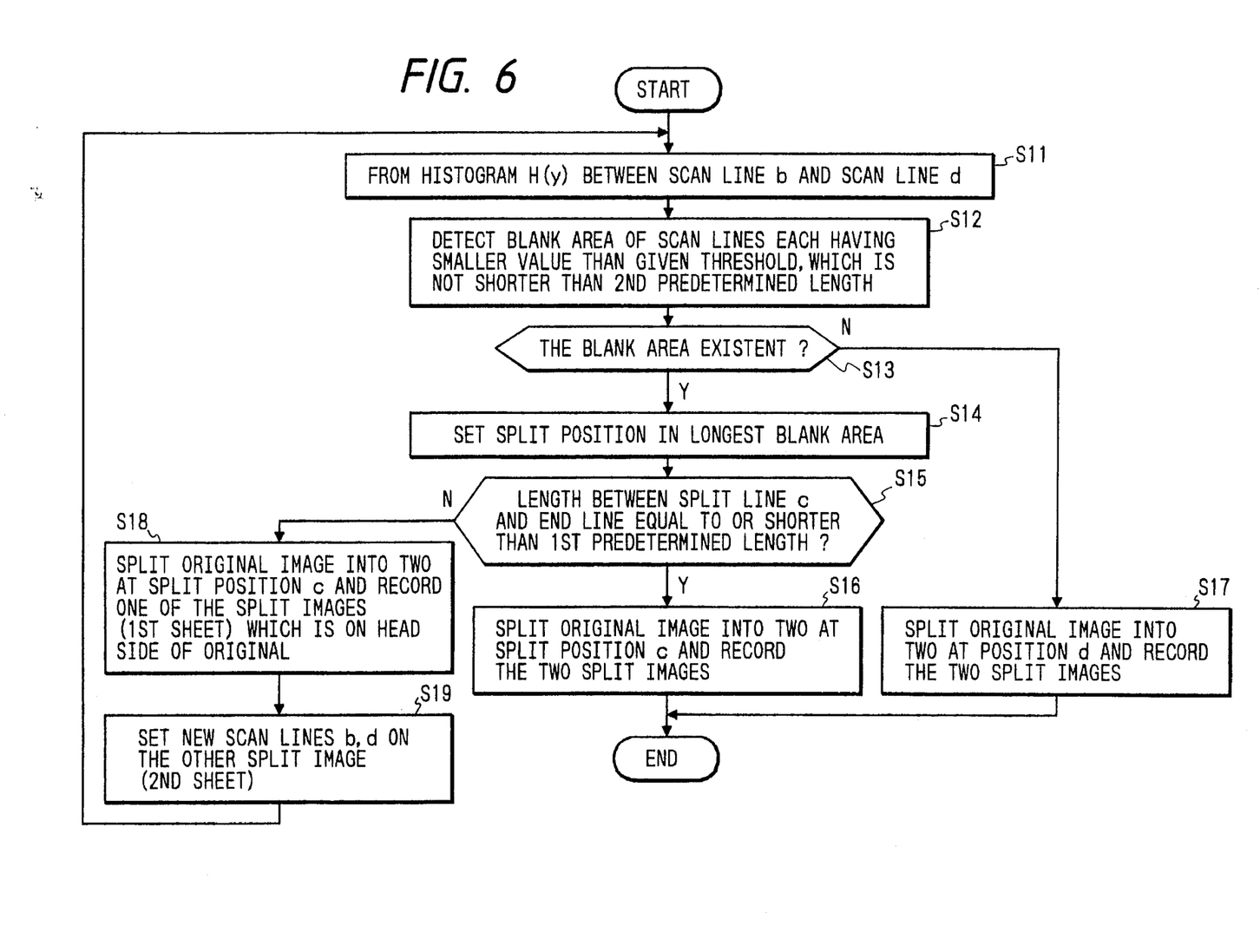
FIG. 6 shows a flow chart of the second embodiment.

A specific operation of the present embodiment when the length of the received document sheet 300 in the direction of sub-scan is longer than the length of the fixed size record sheet of the first predetermined length is explained with reference to a flow chart of FIG. 6.

In S11, a histogram H(y) is prepared in the manner described above between the scan line b at the leading edge of the received document sheet 300 and the scan line d. In S12, a blank area in which no less than a predetermined number of scan lines of smaller than a predetermined threshold is detected based on the histogram H(y). In S13, if it is determined that no such blank area is present, the split process in the direction of sub-scan based on the histogram is not conducted but the original image is recorded as it is while it is split at d by the recorder 6 in S7. In S13, if it is determined that the blank area is present, the document sheet split position is set in the blank area which is longest in the direction of sub-scan in S14, and in S15, if it is determined that the length of the document sheet from the split position line c to the end line of the document sheet in the direction of sub-scan is no longer than the first predetermined length, the record image signal generator 3 generates two images of the document sheet split at the split position c in the image memory 5 and records them by the recorder 6. In S15, if it is determined that the length of the document sheet from the split position line c to the end line of the document sheet in the direction of sub-scan in longer than the first predetermined length, the record image signal generator 3 generates two images of the document sheet split at the split position c in the image memory 5, and the image at the leading edge of the document sheet is first recorded by the recorder 6, and in S19, scan lines b and d are newly set starting from the leading edge c of the image at the trailing edge, and the process returns to S11. In this manner, the image at the trailing edge which is longer than the first predetermined length is first handled as if it were the received document sheet which is longer than the first predetermined length in the direction of sub-scan and the split process is repeated until a plurality of images shorter than the first predetermined length and split in the blank area are produced and they are recorded.

In the above embodiments, the method for detecting the blank area which does not contain significant information such as characters, graphics and photographs in excess of the predetermined condition over the entire main scan area is not limited to that described above but may be other detection method.

In accordance with the present invention, as opposed to the simple split method in the prior art facsimile apparatus in which when it receives a long size document sheet, records it sequentially from the leading edge of the document sheet and when the trailing edge of the fixed size record sheet is reached, the document sheet is split and the remaining portion is recorded on the next fixed size record sheet, the blank area which is longer than the second predetermined length in the direction of sub-scan is substituted by the blank area shorter than the second predetermined length in the direction of sub-scan or the image having a horizontal line inserted in the blank area to conduct the compression process or indicate the completion of the compression process. Accordingly, the characters and the pictures are not split and the received image which is very easy to watch is produced.

Further, in accordance with the present invention, when the long size received image is to be split-recorded, the blank area which is longer than the predetermined length in the direction of sub-scan is searched and the split line is set thereat so that the probability of the split of characters and pictures is reduced and the received image which is very easy to watch is produced.

What is claimed is:

1. A facsimile apparatus comprising:

means for inputting an image signal representing an input image; and substitution means for substituting an image area having consecutive main scan lines each containing no more than a predetermined amount of significant information of the input image which is longer than a first predetermined length by a predetermined image of a second predetermined length shorter than the first predetermined length in a direction of sub-scan to provide a substituted image;

record means for recording the input image on a cut sheet;

detection means for determining whether the length of the input image in the direction of sub-scan is longer than a third predetermined length corresponding to the length of the cut sheet in the direction of sub-scan or not; and control means for conducting the substitution process when said detection means determines that the length of the input image in the direction of sub-scan is longer than the third predetermined length, and causing said record means to record the substituted image on the cut sheet when the length of the substituted image by said substitution means in the direction of sub-scan is not longer than the third predetermined length.

2. A facsimile apparatus according to claim 1 wherein said control means causes said record means to split-record the input image on a plurality of cut sheets when the length of the substituted image by said substitution means in the direction of sub-scan is longer than the third predetermined length.

3. A facsimile apparatus according to claim 1 wherein the predetermined image of the second predetermined length is an all-white image.

4. A facsimile apparatus according to claim 1 wherein the predetermined image of the second predetermined length is an image indicating the completion of the substitution process.

5. A facsimile apparatus according to claim 1 wherein said input means inputs a received image signal.

6. A facsimile apparatus comprising:

receive means for receiving an image signal;

storing means for storing at least one page of the image signal received by said receive means;

record means for recording an image of the received image signal read out from said storing means on a cut sheet;

detection means for determining whether the length of a page of the received image signal stored in said storing means in the direction of sub-scan is longer than a first predetermined length corresponding to the length of the cut sheet in the direction of sub-scan;

discrimination means for discriminating a plurality of areas having consecutive main scan lines longer than a second predetermined length in the direction of sub-scan when said detection means determines that the length of the page is longer than the first predetermined length, each of said main scan lines containing no more than a predetermined amount of significant information in a range from a main scan line located at a third predetermined length from a top of the page in the direction of sub-scan to a main scan line located at the first predetermined length from the top of the page in the direction of sub-scan;

setting means for setting a split position in one of the discriminated plurality of areas; and control means for causing said record means to split-record the page split at the split position on a plurality of cut sheets.

7. A facsimile apparatus comprising:

input means for inputting image data;

record means for recording on a recording paper the image data inputted by said input means;

detection means for detecting a blank area, having a length longer than a first predetermined length, of the image data inputted by said input means, said blank area containing image data having no more than a predetermined amount of significant information;

deletion means for deleting the detected blank area; and control means for controlling said record means to record the image data wherein the blank area is deleted by said deletion means.

8. An apparatus according to claim 7, wherein said input means inputs image data received from a partner station via a communication line.

9. An apparatus according to claim 7, wherein said recording paper is a cut paper.

10. A facsimile apparatus comprising:

input means for inputting image data;

record means for recording on a recording paper the image data inputted by said input means;

deletion means for deleting a blank area of the image data inputted by said input means so as to save consumption of the recording paper, said blank area containing image data having no more than a predetermined amount of significant information;

control means for controlling said record means to record the image data wherein the blank area is deleted by said deletion means; and detection means for detecting a length of the blank area, wherein when said detection means detects that the length of the blank area is longer than a first predetermined length, said deletion means deletes the blank area by replacing the blank area by image data having a second predetermined length shorter than the first predetermined length.

11. An apparatus according to claim 10, wherein said deletion means replaces the blank area by all white image data.

12. An apparatus according to claim 10, wherein said deletion means replaces the blank area by image data having the second predetermined length and an indication that the blank area has been deleted.

* * * * *